(12) United States Patent
Eguchi et al.

(10) Patent No.: US 6,235,867 B1
(45) Date of Patent: May 22, 2001

(54) ALIGNING AGENTS FOR LIQUID CRYSTAL

(75) Inventors: Toshimasa Eguchi, Yokohama; Toshiro Takeda, Utsunomiya, both of (JP)

(73) Assignee: Sumitomo Bakelite Company Limited, Tokyo (JP)

( * ) Notice: Subject to any disclaimer, the term of this patent is extended or adjusted under 35 U.S.C. 154(b) by 0 days.

(21) Appl. No.: 09/403,614

(22) PCT Filed: Mar. 19, 1998

(86) PCT No.: PCT/JP98/01178

§ 371 Date: Nov. 5, 1999

§ 102(e) Date: Nov. 5, 1999

(87) PCT Pub. No.: WO99/47968

PCT Pub. Date: Sep. 23, 1999

(51) Int. Cl.⁷ .......................... C08G 73/10; G02F 1/1337
(52) U.S. Cl. ............... 528/170; 528/26; 528/43; 528/172; 528/173; 528/183; 528/188; 528/220; 528/229; 528/350; 528/353; 428/1.1; 428/1.2; 428/1.23; 428/1.26
(58) Field of Search ..................... 528/353, 350, 528/26, 43, 172, 173, 183, 188, 220, 229, 170; 428/1.1, 1.2, 1.23, 1.26

(56) References Cited

U.S. PATENT DOCUMENTS 5,206,337 * 4/1993 Takeda et al. .................... 528/26
5,739,263 * 4/1998 Yoshida et al. ................... 528/353

FOREIGN PATENT DOCUMENTS

| | | |
|---|---|---|
| 62-38689 | 8/1987 | (JP) . |
| 1-177514 | 7/1989 | (JP) . |
| 3-164714 | 7/1991 | (JP) . |
| 3-261915 | 11/1991 | (JP) . |
| 9-127511 | 5/1997 | (JP) . |
| 10-95845 | 4/1998 | (JP) . |

* cited by examiner

Primary Examiner—P. Hampton-Hightower
(74) Attorney, Agent, or Firm—Smith, Gambrell & Russell, LLP

(57) ABSTRACT

The present invention provides a liquid crystal-aligning agent including, as the resin component, a polyimide precursor containing a chemical structure represented by the following formula (1):

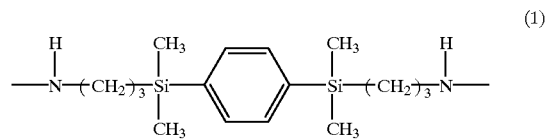

(1)

The present invention further provides a liquid crystal-aligning agent including, the above polyimide precursor and a polyimide precursor represented by the following general formula (2):

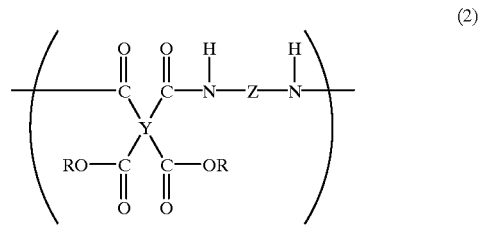

(2)

(wherein Y is a tetravalent aliphatic group, Z is a bivalent aromatic group, and R is H or an alkyl group).

15 Claims, No Drawings

ALIGNING AGENTS FOR LIQUID CRYSTAL

TECHNICAL FIELD

The present invention relates to a liquid crystal-aligning agent used in production of liquid crystal display devices. More particularly, the present invention relates to a liquid crystal-aligning agent capable of providing a liquid crystal display device having a high pretilt angle stability.

BACKGROUND ART

Liquid crystal display devices are currently in wide use as a thin display. Liquid crystal display devices of general use are a twisted nematic (TN) type and a super twisted nematic (STN) type. In producing these liquid crystal display devices, as disclosed in JP-B-62-38689 an alignment layer is necessary for allowing a liquid crystal interposed between two substrates with transparent electrodes, to align in a particular direction relative to the substrates. Further in the liquid crystal display devices of TN type and STN type, the liquid crystal must be aligned in inclination, i.e. at a pretilt angle relative to the substrate surfaces. This needs to be achieved by the liquid crystal-aligning agent used. The pretilt angle is required to be 4 to 8° in, for example, the STN type. As the liquid crystal-aligning agent capable of achieving such a high pretilt angle, there are mentioned a polyimide precursor solution as described in JP-A-1-177514 and a soluble polyimide solution as described in JP-A-3-261915. In the liquid crystal display devices produced using such a liquid crystal-aligning agent, however, there are problems that the pretilt angle is not sufficiently stable and decreases in a high-temperature environment of 80° C. or higher, etc., inviting poor display.

As a different method for achieving a high pretilt angle, there is introduction of siloxane structure as described in JP-A-3-164714. In this method, however, introduction of a siloxane structure to a high degree makes bad the alignment of the liquid crystal and, therefore, in some cases the siloxane structure can not be introduced in an amount necessary to obtain a sufficient pretilt angle.

As liquid crystal display devices have come to possess improved properties in recent years, it has become necessary that materials for the alignment layer possess more properties than before. Specifically, the materials for the alignment layer must give a stable pretilt angle as mentioned above and have good electrical properties and, in the production of liquid crystal devices, must show uniform film formability, anti-rubbing property, etc. Further, since a lower temperature has come to be employed in production of liquid crystal display devices in recent years, the materials for the alignment layer must show the above-mentioned properties at levels equal to or higher than the past levels even when a firing temperature lower than 200° C. is employed.

DISCLOSURE OF THE INVENTION

The present invention relates to a liquid crystal-aligning agent which overcomes the above-mentioned problems of conventional liquid crystal-aligning agents and which is capable of providing a liquid crystal display device having a high pretilt angle stability.

That is, the present invention provides a liquid crystal-aligning agent comprising, as the resin component, a polyimide precursor containing a chemical structure represented by the following formula (1):

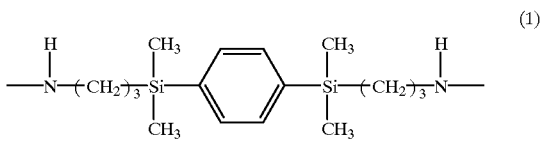

Preferred embodiments of the present invention include the above liquid crystal-aligning agent wherein the polyimide precursor is a polyamic acid, and the above liquid crystal-aligning agent wherein the polyimide precursor is a polyamic acid ester.

The present invention further provides a liquid crystal-aligning agent comprising, as the essential components, the above polyimide precursor and a polyimide precursor represented by the following general formula (2):

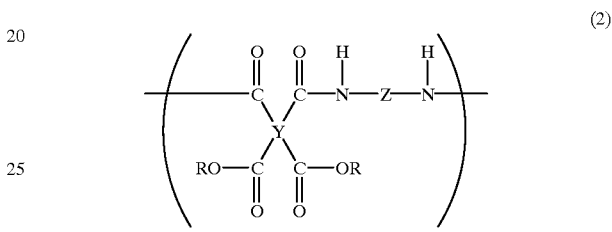

(wherein Y is a tetravalent aliphatic group, Z is a bivalent aromatic group, and R is H or an alkyl group).

DETAILED DESCRIPTION OF THE INVENTION

The liquid crystal-aligning agent of the present invention comprising, as the resin component, a polyimide precursor containing a structure represented by the formula (1) can allow a liquid crystal to make good alignment and makes it possible to obtain a high pretilt angle.

The polyimide precursor containing a structure resented by the formula (1), used in the present invention can be obtained by reacting 1,4-bis(3-aminopropyldimethylsilyl) benzene with a tetracarboxylic acid dianhydride or the like in a polar solvent. A polyamic acid can be obtained when a tetracarboxylic acid dianhydride is used. A polyamic acid ester can be obtained when the polyamic acid is esterified or when the above reaction is conducted using a tetracarboxylic acid diester.

Examples of the tetracarboxylic acid dianhydride are pyromellitic acid dianhydride, 3,3',4,4'-biphenyltetracarboxylic acid dianhydride, 3,3',4,4'-benzophenonetetracarboxylic acid dianhydride, butanetetracarboxylic acid dianhydride, cyclobutanetetracarboxylic acid dianhydride, cyclopentanetetacarboxylic acid dianhydride, 1,2,4,5-cyclohexanetetracarboxylic acid dianhydride, bicyclo[2,2,2]octo-7-ene-2,3,5,6-tetracarboxylic acid dianhydride, 5-(2,5-dioxotetrahydro-3-furanyl)-3-methyl-3-cyclohexene-1,2-dicarboxylic acid anhydride, 2,3,5-tricarboxycyclopentylacetic acid dianhydride, and 3,4-dicarboxy-1,2,3,4-tetrahydro-1-naphthalenesuccinic acid dianhydride. The tetracarboxylic acid dianhydride, however, is not restricted to these examples.

The polyamic acid ester can be obtained by reacting a tetracarboxylic acid dianhydride with an alcohol (e.g. methanol, ethanol, 1-propanol or 2-propanol) to form a tetracarboxylic acid diester, and subjecting the diester to condensation under dehydration with a diamine, or by subjecting a polyamic acid to condensation under dehydration with an alcohol.

In producing the polyimide precursor containing a structure represented by the formula (1), used in the present invention, a diamine other than 1,4-bis(3-aminopropyldimethylsilyl)benzene may be used as long as the use does not impair the effect of the structure represented by the formula (1). Examples of the diamine are p-phenylenediamine, m-phenylenediamine, 2,5-diaminotoluene, 3,5-diaminotoluene, 2,5-diamino-p-xylene, 3,3'-dimethylbenzidine, 3,4'-diaminodiphenyl ether, 4,4'-diaminodiphenyl ether, 4,4'-diaminodiphenylmethane, 4,4'-diaminodiphenylsulfone, 1,3-(3-aminophenoxy)benzene, 1,3-(4-aminophenoxy)benzene, 1,4-(3-aminophenoxy) benzene, 1,4-(4-aminophenoxy)benzene, 4,4'-(4-aminophenoxy)biphenyl, 2,2-bis[4,4'-(4-aminophenoxy) phenyl]propane, 2,2-bis[4,4'-(4-aminophenoxy)phenyl] hexafluoropropane, 2,2-bis[4,4'-(4-aminophenoxy)phenyl] sulfone, 1,3-bis(4-aminophenoxy)-propane, 1,4-bis(4-aminophenoxy)butane, ethylenediamine, 1,3-diaminopropane, 1,4-diaminobutane, 1,5-diaminopentane, 1,6-diaminohexane, 1,7-diaminoheptane, 1,8-diaminooctane, 1,10-diaminodecane, 1,12-diaminododecane, 1,4-diaminocyclohexane, and 4,4'-diaminodicyclohexylmethane. The diamine is not restricted to these examples.

In the present invention, when the liquid crystal-aligning agent comprises, as the resin components, both of the polyimide precursor containing a structure represented by the formula (1) and the polyimide precursor represented by the general formula (2), very good electrical properties are obtained.

The polyimide precursor represented by the general formula (2), used in the present invention can be obtained by reacting an aliphatic tetracarboxylic acid dianhydride or the like with an aromatic diamine in a polar solvent. A polyamic acid can be obtained when an aliphatic tetracarboxylic acid dianhydride is used, and a polyamic acid ester can be obtained when the polyamic acid is esterified or when an aliphatic tetracarboxylic acid diester is used in the above reaction.

Examples of the aliphatic tetracarboxylic acid dianhydride used for obtaining the polyimide precursor represented by the general formula (2) used in the present invention are butanetetracarboxylic acid dianhydride, cyclobutanetetracarboxylic acid dianhydride, cyclopentanetetracarboxylic acid dianhydride, 1,2,4,5-cyclohexanetetracarboxylic acid dianhydride, bicyclo[2,2,2]octo-7-ene-2,3,5,6-tetracarboxylic acid dianhydride, 5-(2,5-dioxotetrahydro-3-furanyl)-3-methyl-3-cyclohexene-1,2-dicarboxylic acid anhydride, 2,3,5-tricarboxycyclopentylacetic acid dianhydride, and 3,4-dicarboxy-1,2,3,4-tetrahydro-1-naphthalenesuccinic acid dianhydride. The aliphatic tetracarboxylic acid dianhydride, however, is not restricted to these examples.

Examples of the aromatic diamine used for obtaining the polyimide precursor represented by the general formula (2) used in the present invention are p-phenylenediamine, m-phenylenediamine, 2,5-diaminotoluene, 3,5-diaminotoluene, 2,5-diamino-p-xylene, 3,3'-dimethylbenzidine, 3,4'-diaminodiphenyl ether, 4,4'-diaminodiphenyl ether, 4,4'-diaminodiphenylmethane, 4,4'-diaminodiphenylsulfone, 1,3-(3-aminophenoxy)benzene, 1,3-(4-aminophenoxy)benzene, 1,4-(3-aminophenoxy) benzene, 1,4-(4-aminophenoxy)benzene, 4,4'-(4-aminophenoxy)biphenyl, 2,2-bis[4,4'-(4-aminophenoxy) phenyl]propane, 2,2-bis[4,4'-(4-aminophenoxy)phenyl] hexafluoropropane, 2,2-bis[4,4'-(4-aminophenoxy)phenyl] sulfone, 1,3-bis(4-aminophenoxy)propane, and 1,4-bis(4-aminophenoxy)butane. The aromatic diamine, however, is not restricted to these examples.

Examples of the polar organic solvent used in the polymerization for obtaining any of the polyimide precursors used in the present invention are N-methyl-2-pyrrolidone, dimethylformamide and dimethylacetamide. The polar organic solvent, however, is not restricted to these examples.

The liquid crystal-aligning agent of the present invention comprises a resin component and a solvent component. Preferred examples of the solvent component used in the liquid crystal-aligning agent of the present invention are a mixed solvent of N-methyl-2-pyrrolidone (NMP) and butyl cellosolve, a mixed solvent of NMP and ethylcarbitol, a mixed solvent of NMP and propylene glycol mono-n-butyl ether, a mixed solvent of NMP and propylene glycol diacetate, and a mixed solvent of dimethylacetamide and butyl cellosolve. The solvent component, however, is not restricted to these examples. The liquid crystal-aligning agent of the present invention may further comprise a very small amount of a silane coupling agent or a titanium-based coupling agent for improved adhesion to a substrate.

BEST MODE FOR CARRYING OUT THE INVENTION

The present invention is described in detail below by way of Examples. However, the present invention is in no way restricted by these Examples.

Synthesis Example 1

In a four-necked separable flask equipped with a thermometer, a stirrer, a dropping funnel and a dry nitrogen gas-introducing tube, 21.81 g (0.10 mole) of pyromellitic acid dianhydride was dispersed in 300 g of N-methyl-2-pyrrolidone (NMP). In the dropping funnel, 12.62 g (0.05 mole) of 1,4-bis(3-aminopropyldimethylsilyl)benzene was uniformly dissolved in 100 g of NMP, and the whole amount of the resulting solution in the dropping funnel was dropped into the separable flask while the flask contents were stirred at 10° C. in a nitrogen current. Then, stirring was conducted for 3 hours. The dropping funnel was removed; 20.53 g (0.05 mole) of 2,2-bis[4,4'-(4-aminophenoxy)phenyl]propane was added into the separable flask; and the resulting mixture was stirred at 10° C. for 5 hours. The system was returned to room temperature to obtain an NMP solution of a polyamic acid. The solution was diluted with NMP and butyl cellosolve so that the concentration of resin component became 5% and the ratio of NMP and butyl cellosolve became 8:2, whereby a liquid crystal-aligning agent (1) was obtained.

Synthesis Example 2

In a four-necked separable flask equipped with a thermometer, a stirrer, a dropping funnel and a dry nitrogen gas-introducing tube, 29.42 g (0.10 mole) of 3,3',4,4'-biphenyltetracarboxylic acid dianhydride was dispersed in 300 g of N-methyl-2-pyrrolidone (NMP). In the dropping funnel, 25.24 g (0.10 mole) of 1,4-bis(3-aminopropyldimethylsilyl)benzene was uniformly dissolved in 100 g of NMP, and the whole amount of the resulting solution in the dropping funnel was dropped into the separable flask while the flask contents were stirred at 10° C. in a nitrogen current. Then, stirring was conducted for 8 hours. The system was returned to room temperature to obtain an NMP solution of a polyamic acid. The solution was diluted with NMP and butyl cellosolve so that the concentration of resin component became 5% and the ratio of NMP and butyl cellosolve became 8:2, whereby a liquid crystal-aligning agent (2) was obtained.

Synthesis Example 3

In a four-necked separable flask equipped with a thermometer, a stirrer, a dropping funnel and a dry nitrogen gas-introducing tube, 21.81 g (0.10 mole) of pyromellitic acid dianhydride was dispersed in 300 g of NMP. While the system was stirred at 20° C. in a nitrogen current, 15.82 g (0.20 mole) of pyridine was dropped thereinto from the dropping funnel, after which stirring was conducted for 3 hours. Then, 6.41 g (0.20 mole) of methanol was dropped from the dropping funnel, and stirring was conducted for 5 hours. The system was cooled to 10° C., and a solution of 41.27 g (0.20 mole) of dicyclohexylcarbodiimide dissolved in 100 g of NMP was dropped from the dropping funnel, followed by stirring for 30 minutes. Thereto were added 12.62 g (0.05 mole) of 1,4-bis(3-aminopropyldimethylsilyl) benzene and 10.01 g (0.05 mole) of 4,4'-diaminodiphenyl ether, and stirring was conducted for 8 hours. The resulting suspension was dropped into a 20-fold 1:1 mixture of water and methanol. The resulting solid was collected by filtration and vacuum-dried at 25° C. for 48 hours to obtain a polyamic acid ester. 5 g of the polyamic acid ester was dissolved in 95 g of a 8:2 mixed solvent of γ-butyrolactone and butyl cellosolve to obtain a liquid crystal-aligning agent (3).

Synthesis Example 4

In a four-necked separable flask equipped with a thermometer, a stirrer, a dropping funnel and a dry nitrogen gas-introducing tube, 19.83 g (0.10 mole) of 4,4'-diaminodiphenylmehtane was dispersed in 300 g of NMP. While the system was stirred at 10° C. in a nitrogen current, thereto was added 19.81 g (0.10 mole) of butanetetracarboxylic acid dianhydride. The resulting mixture was stirred at 10° C. for 5 hours. The system was returned to room temperature to obtain an NMP solution of a polyamic acid. The solution was diluted with NMP and butyl cellosolve so that the concentration of resin component became 5% and the ratio of NMP and butyl cellosolve became 8:2. 70 g of the resulting solution was mixed with 30 g of the aligning agent (3) to obtain a liquid crystal-aligning agent (4).

Example 1

The liquid crystal-aligning agent (1) obtained in Synthesis Example 1 was spin-coated on a glass substrate with an ITO transparent electrode, and the coated substrate was dried in a clean oven at 170° C. for 120 minutes. The substrate was rubbed and, using it, an antiparallel cell having a cell gap of 50 μm was formed. A liquid crystal (ZLI-2293, a product of Merck) was poured into the cell. The resulting liquid crystal cell was heated to 100° C. and slowly cooled to room temperature. Observation was made using a polarizing microscope, which indicated good alignment of the liquid crystal. The pretilt angle of the liquid crystal was 6.0° as measured by a crystal rotation method. The liquid crystal cell was allowed to stand at 90° C. for 1,000 hours and then measured for pretilt angle, which was 6.0°. A liquid crystal cell having a cell gap of 7 μm was produced in the same manner and allowed to stand at 90° C. for 1,000 hours. Before and after the standing, a sine wave of 33 Hz±5V was applied to the cell and a current value was measured. As a result, the current value after the standing at 90° C. for 1,000 hours was 1.3 times the current value before the standing.

Example 2

The operation of Example 1 was repeated using the liquid crystal-aligning agent (2) obtained in Synthesis Example 2. Alignment of the liquid crystal was good; the pretilt angle of the liquid crystal was 6.4° before the standing at 90° C. for 1,000 hours and 6.2° after the standing for 1,000 hours; and the increased current value was 1.2 times.

Example 3

The operation of Example 1 was repeated using the liquid crystal-aligning agent (3) obtained in Synthesis Example 3. Alignment of the liquid crystal was good; the pretilt angle of the liquid crystal was 5.0° before the standing at 90° C. for 1,000 hours and 5.0° after the standing for 1,000 hours; and the increased current value was 1.3 times.

Example 4

The operation of Example 1 was repeated using the liquid crystal-aligning agent (4) obtained in Synthesis Example 4. Alignment of the liquid crystal was good; the pretilt angle of the liquid crystal was 6.0° before the standing at 90° C. for 1,000 hours and 6.0° after the standing for 1,000 hours; and the increased current value was 1.0 times.

Comparative Example 1

In a four-necked separable flask equipped with a thermometer, a stirrer, an inlet for raw materials and a dry nitrogen gas-introducing tube, 21.81 g (0.10 mole) of pyromellitic acid dianhydride was dispersed in 300 g of NMP. While the system was stirred at 10° C. in a nitrogen current, thereto was added 20.53 g (0.05 mole) of 2,2-bis [4,4'-(4-aminophenoxy)phenyl]propane from the inlet for raw materials. The resulting mixture was stirred at 10° C. for 5 hours. The system was returned to room temperature to obtain an NMP solution of a polyamic acid. The solution was diluted with NMP and butyl cellosolve so that the concentration of resin component became 5% and the ratio of NMP and butyl cellosolve became 8:2, whereby a liquid crystal-aligning agent (5) was obtained.

The operation of Example 1 was repeated using the liquid crystal-aligning agent (5). Alignment of the liquid crystal was good; the pretilt angle of the liquid crystal was 2.5° before the standing at 90° C. for 1,000 hours and 2.5° after the standing for 1,000 hours; and the increased current value was 2.1 times.

Comparative Example 2

In a four-necked separable flask equipped with a thermometer, a stirrer, a dropping funnel and a dry nitrogen gas-introducing tube, 29.42 g (0.10 mole) of 3,3',4,4'-biphenyltetracarboxylic acid dianhydride was dispersed in 300 g of NMP. In the dropping funnel, 24.85 g (0.10 mole) of 1,3-bis(3-aminopropyl)tetramethyldisiloxane was uniformly dissolved in 100 g of NMP, and the whole amount of the resulting solution in the dropping funnel was dropped into the separable flask while the flask contents were stirred at 10° C. in a nitrogen current. Then, stirring was conducted for 8 hours. The system was returned to room temperature to obtain an NMP solution of a polyamic acid. The solution was diluted with NMP and butyl cellosolve so that the concentration of resin component became 5% and the ratio of NMP and butyl cellosolve became 8:2, whereby a liquid crystal-aligning agent (6) was obtained.

The operation of Example 1 was repeated using the liquid crystal-aligning agent (6). Alignment of the liquid crystal was bad.

Comparative Example 3

In a four-necked separable flask equipped with a thermometer, a stirrer, a dropping funnel and a dry nitrogen gas-introducing tube, 21.81 g (0.10 mole) of pyromellitic acid dianhydride was dispersed in 300 g of NMP. While the system was stirred at 20° C. in a nitrogen current, 15.82 g (0.20 mole) of pyridine was dropped thereinto from the dropping funnel, after which stirring was conducted for 3 hours. Then, 6.41 g (0.20 mole) of methanol was dropped from the dropping funnel, and stirring was conducted for 5 hours. The system was cooled to 10° C., and a solution of 41.27 g (0.20 mole) of dicyclohexylcarbodiimide dissolved in 100 g of NMP was dropped from the dropping funnel, followed by stirring for 30 minutes. Thereto was added 24.85 g (0.10 mole) of 1,3-bis(3-aminopropyl) tetramethyldisiloxane, and stirring was conducted for 8 hours. The resulting suspension was dropped into a 20-fold 1:1 mixture of water and methanol. The resulting solid was collected by filtration and vacuum-dried at 25° C. for 48 hours to obtain a polyamic acid ester. 5 g of the polyamic acid ester was dissolved in 95 g of a 8:2 mixed solvent of γ-butyrolactone and butyl cellosolve to obtain a liquid crystal-aligning agent (7).

The operation of Example 1 was repeated using the liquid crystal-aligning agent (7). Alignment of the liquid crystal was bad.

In any of the Examples 1 to 4, good alignment of liquid crystal and a high pretilt angle of 5.0 to 7.0 were obtained, and the change of pretilt angle after standing at 90° C. for 1,000 hours was very small, indicating good stability of the pretilt angle. The increase in current value was small at 1.3 times or less; particularly in Example 4, the increase was none at 1.0 time and good.

In Comparative Example 1, since a polyamic acid not containing the chemical structure represented by the formula (1) was used as a liquid crystal-aligning agent, the pretilt angle was low at 2.5 and the increase in current value was large at 2.1 times.

In Comparative Example 2, since a polyamic acid containing a siloxane structure, which is not the chemical structure represented by the formula (1), was used, alignment of the liquid crystal was bad.

In Comparative Example 3, since a polyamic acid ester containing a siloxane structure, which is not the chemical structure represented by the formula (1), was used, alignment of the liquid crystal was bad.

Thus, the liquid crystal-aligning agent of the present invention can give good alignment of the liquid crystal and a high and stable pretilt angle of the liquid crystal and can provide a liquid crystal display device of good display property and high reliability.

Industrial Applicability

The present invention relates to a liquid crystal-aligning agent used in production of the liquid crystal display devices. More particularly, the present invention relates to a liquid crystal-aligning agent capable of providing a liquid crystal display device having a high and stable pretilt angle. Therefore, the present invention can be applied in various industries using a liquid crystal.

What is claimed is:

1. A liquid crystal-aligning agent comprising, as a resin component, a polyimide precursor containing a chemical structure represented by the following formula (1):

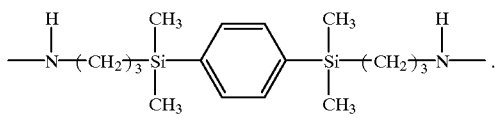

2. A liquid crystal-aligning agent according to claim 1, wherein the polyimide precursor is a polyamic acid.

3. A liquid crystal-aligning agent according to claim 1, wherein the polyimide precursor is a polyamic acid ester.

4. A liquid crystal-aligning agent according to claim 1, further including a polyimide precursor represented by the following formula (2):

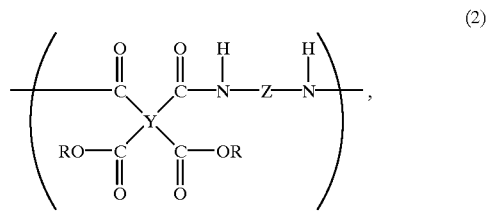

wherein Y is a tetravalent aliphatic group, Z is a bivalent aromatic group, and R is H or an alkyl group.

5. A liquid crystal-aligning agent according to claim 2, further including a polyimide precursor represented by the following (2):

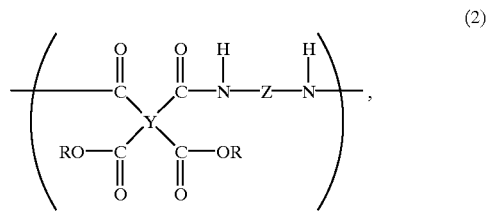

wherein Y is a tetravalent aliphatic group, Z is a bivalent aromatic group, and R is H or an alkyl group.

6. A liquid crystal-aligning agent according to claim 3, further including a polyimide precursor represented by the following formula (2):

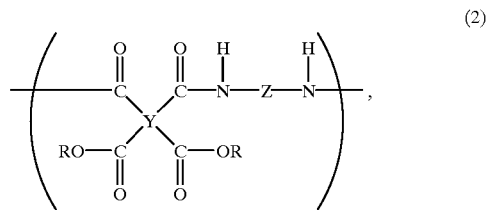

wherein Y is a tetravalent aliphatic group, Z is a bivalent aromatic group, and R is H or an alkyl group.

7. A liquid crystal-aligning agent comprising:

a resin component, wherein the resin component includes a polyimide precursor containing a chemical structure represented by the following formula (1):

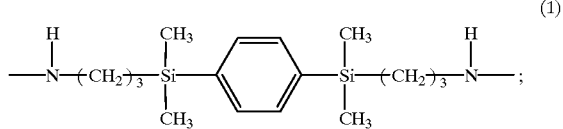

(1)

and a solvent component.

8. A liquid crystal-aligning agent according to claim 7, wherein the polyimide precursor is a polyamic acid.

9. A liquid crystal-aligning agent according to claim 7, wherein the polyimide precursor is a polyamic acid ester.

10. A liquid crystal-aligning agent according to claim 7, further including a polyimide precursor represented by the following formula (2):

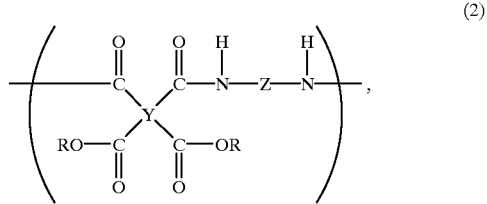

(2)

wherein Y is a tetravalent aliphatic group, Z is a bivalent aromatic group, and R is H or an alkyl group.

11. A liquid crystal-aligning agent according to claim 8, further including a polyimide precursor represented by the following formula (2):

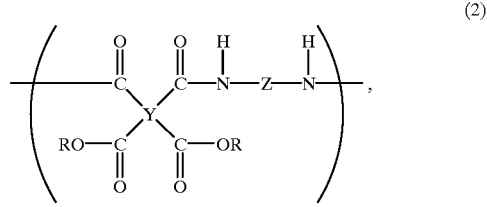

(2)

wherein Y is a tetravalent aliphatic group, Z is a bivalent aromatic group, and R is H or an alkyl group.

12. A liquid crystal-aligning agent according to claim 9, further including a polyimide precursor represented by the following formula (2):

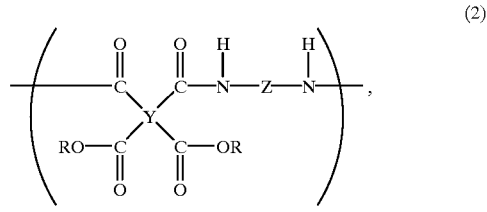

(2)

wherein Y is a tetravalent aliphatic group, Z is a bivalent aromatic group, and R is H or an alkyl group.

13. A liquid crystal-aligning agent according to claim 7, wherein the solvent component is selected from the group consisting of: a mixed solvent of N-methyl-2-pyrrolidone and butyl cellosolve; a mixed solvent of N-methyl-2-pyrrolidone and ethylcarbitol; a mixed solvent of N-methyl-2-pyrrolidone and propylene glycol mono-n-butyl ether; a mixed solvent of N-methyl-2-pyrrolidone and propylene glycol diacetate; and a mixed solvent of dimethylacetamide and butyl cellosolve.

14. A liquid crystal-aligning agent according to claim 7, further including a silane coupling agent.

15. A liquid crystal-aligning agent according to claim 7, further including a titanium based coupling agent.

* * * * *